United States Patent [19]

Snelling

[11] Patent Number: 5,050,469
[45] Date of Patent: Sep. 24, 1991

[54] CUTTING OF PLASTIC SHEET

[75] Inventor: Peter J. Snelling, West Lakes, Australia

[73] Assignee: Vinidex Tubemakers Pty. Limited, Gordon, Australia

[21] Appl. No.: 382,791

[22] PCT Filed: Oct. 19, 1988

[86] PCT No.: PCT/AU88/00409
§ 371 Date: Jun. 19, 1989
§ 102(e) Date: Jun. 19, 1989

[87] PCT Pub. No.: WO89/03750
PCT Pub. Date: May 5, 1989

[30] Foreign Application Priority Data

Oct. 19, 1987 [AU] Australia .................................. PI4944

[51] Int. Cl.⁵ ........................... B26D 7/10; B26D 7/27
[52] U.S. Cl. ............................................. 83/16; 83/170;
83/171; 83/102; 264/160; 425/289; 425/384
[58] Field of Search ...................... 83/15, 16, 170, 171,
83/102.1, 659, 508, 349; 264/157, 160, 146, 147,
145, 151; 51/314, 322; 219/121.49; 72/201;
156/271, 259; 493/341

[56] References Cited

U.S. PATENT DOCUMENTS 2,007,887 7/1935 Tautz ................................. 83/102.1
3,251,252 5/1966 Lefevre ..................... 83/16
4,008,720 2/1977 Brinckmann et al. ............. 83/169 X
4,018,117 4/1977 Patterson ......................... 83/171 X
4,489,630 12/1984 Okada et al. ........................ 83/16 X
4,539,467 9/1985 Wenger ............................. 83/171 X
4,679,474 7/1987 Lambrecht ............................. 83/171
4,783,983 11/1988 Narasimhan ...................... 83/171 X
4,921,563 5/1990 Schwertner et al. ................ 264/146

Primary Examiner—Hien H. Phan
Assistant Examiner—Kenneth E. Peterson

[57] ABSTRACT

An apparatus for slitting foil (14) of thermoplastics material comprises a mover to move the foil (14) through a slitting station (1), the slitting station (1) having a first slitting blade (2) having a sharp front edge (4) located extend transversely through the path of the moving foil (14), and that part (5) of the blade (2) behind the front edge (4) having each side (6), sharped to be non-intrusive into the slit and melted thermoplastics material foil (14), a heater (8,9) to raise and maintain a temperature of the slitting blade (2) to a temperature equal to or above a melting temperature of the thermoplastics material foil (14) selected to be slit by the slitting blade (2), and a cooling blade (3) located behind and aligned with the slitting blade (2) and having two sides each adapted to be aligned with the corresponding side of the slit of thermoplastics material foil (14) and provide by both contact and radiant heating effects, a substantial cooling effect.

11 Claims, 2 Drawing Sheets

CUTTING OF PLASTIC SHEET

CROSS REFERENCE TO RELATED APPLICATION

Applicant under 35 USC 120 and 35 USC 365(c) claims the benefit of the filing date of International Application PCT/AU88/00409, filed 19 October 1988 and naming the United States as one of the designated states. The present application is a continuation of said International Application.

BACKGROUND OF THE INVENTION

1. Field of the Invention

This invention relates to effecting cutting or slitting of thermoplastics sheet or foil.

2. Description of the Related Art

SUMMARY OF THE INVENTION

The problem to which this invention is directed relates to a difficulty associated with providing a continuous cutting or slitting of a sheet or sheets of thermoplastics material where such sheet or foil is required to be separate for whatever purpose.

Such purpose might occur, for instance, where the thermoplastics material in sheet form is welded to other sheets and is formed in a plurality of adjacent conduits having integrated water resistant outlet channels integrated therein.

There are efficiencies in forming such channels as a multiple number of channels in adjacent relationship but it then becomes necessary to separate by slitting such conduits one from the other.

There are, accordingly, three sheets of the appropriate thermoplastics material which are welded together and which have to be slit.

It would appear at first sight that all that would be necessary would be to insert a sharp blade at a slitting station and this would be sufficient to effect the slitting as the foil is moved through the slitting station.

Unfortunately, the problem is somewhat more difficult.

A first problem is that any sharpened blade very quickly becomes blunt.

Self-evidently, this is solved by replacing the blade or providing a mechanism by which the blade is replaced on a regular basis but there are costs involved to provide such blades on such a continuing replacement basis and there is furthermore a necessity that the mechanism should be reliable to effect such replacement.

There is, however, a further difficulty in the mere use of a blade.

Because the sheet plastics material can be formed by an extruding process in which the polymer chains may only be approximately aligned in a longitudinal direction, it is found that when a blade is caused to cut on a continuing basis through such sheet, there can be a side tracking effect which can cause substantial misalignment of the slitting location and also can cause undue strain on other parts of an apparatus causing the plastic to pass the slitting station.

Both the life of the cutting blade and the tracking effect can be overcome by providing that the blade, while still sharp, is nonetheless caused to be heated and kept at a temperature so that the cutting effect is combined with a melting effect as the tape engages the blade.

This implicity implies that the blade is made from a thermally conducting material and is heated to such a temperature that such elevated temperature can be rapidly transferred to the approaching plastics material.

One further problem arises, however, in that with a melting of the plastics material, it is found that this causes a substantial build up of material which while partially melted or adhering to parts of the blade, nonetheless accumulate immediately subsequent to the blade and can reach retained quantities that it is necessary, from time to time, to manually clean such materials away from the location.

Apart from the inconvenience from having to constantly monitor such build up, there is the decided difficulty that if it is overlooked at any time such a build up can interfere eventually with the cutting process and can eventually cause a blockage resisting further passage of foil through a slitting station.

According to this invention then, it is proposed that there be located adjacent but behind the first slitting blade, a cooling means whereby to cause resolidification of the plastics material very soon after the slitting action.

The result of this action is to cause such a previously melted plastics material to stay adhered in the close vicinity of the slit edges so that it is then carried away by the continuing passage of the plastics material.

Accordingly, by merely causing a cooling effect behind the first heated slitting blade, the debris can be caused to remain attached to the passing plastics material and it, therefore, becomes self cleansing.

BRIEF DESCRIPTION OF THE DRAWING

For a better understanding of this invention it will now be described in relation to a preferred embodiment which shall now be described with the assistance of drawings in which.

DESCRIPTION OF THE PREFERRED EMBODIMENT(S)

Figure 1:
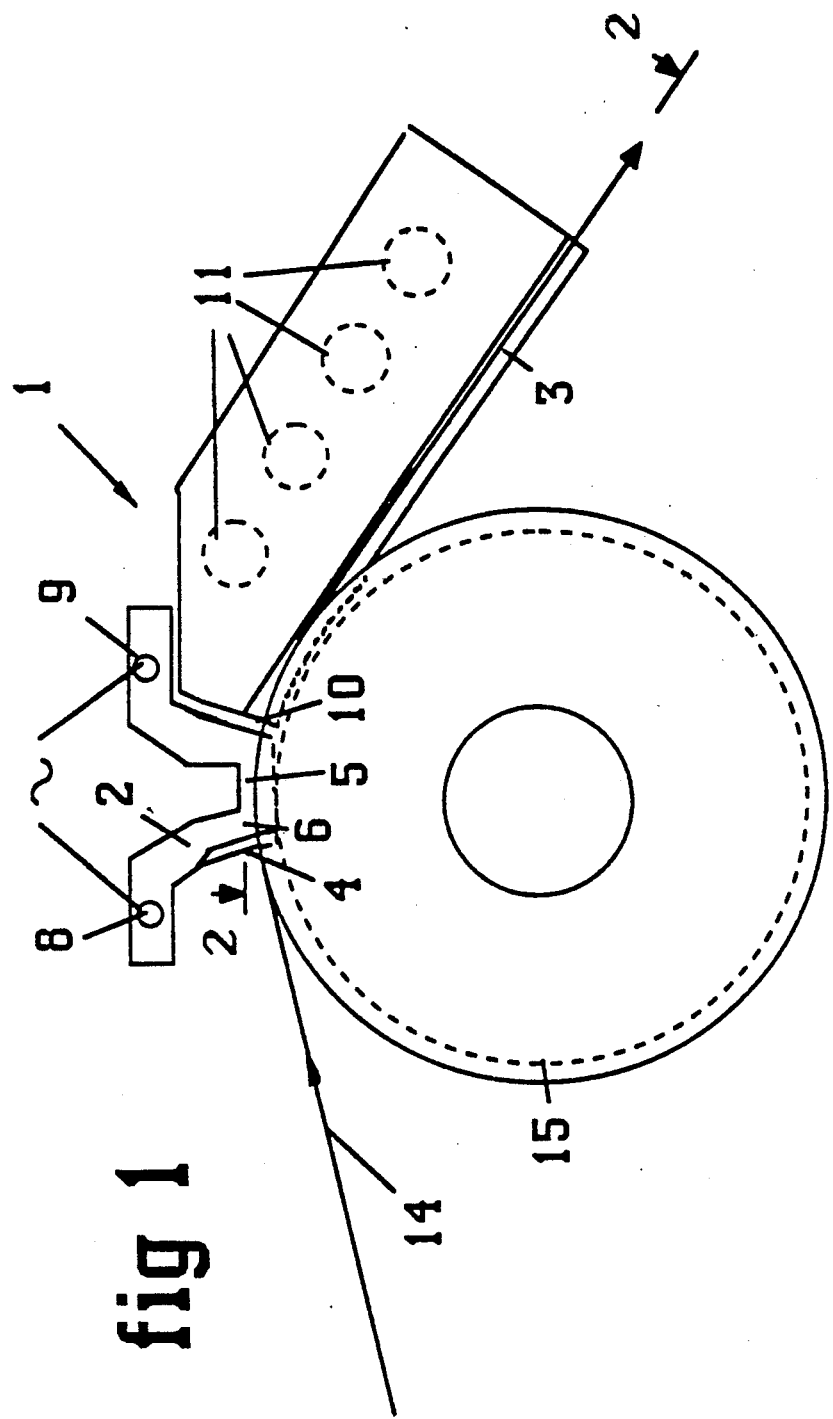
FIG. 1 is a side elevation of a slitting station constructed in accordance with the embodiment, and, FIG. 2 is a plan view from a cross section along the lines 2-2 in FIG. 1, showing, furthermore, the approaching thermoplastics foil.
Figure 2:
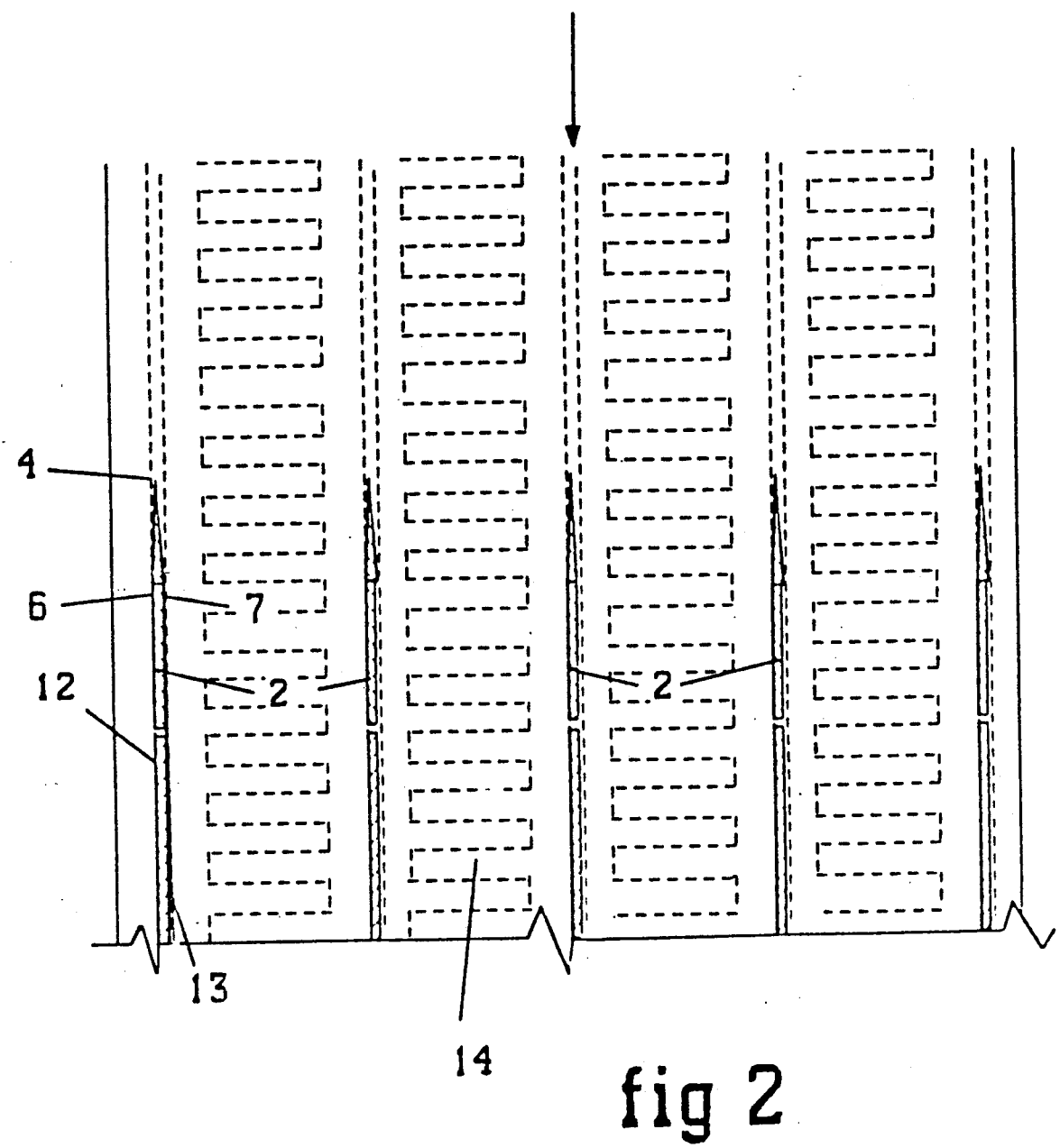

Referring in detail to the drawings, there is shown a slitting station 1 which includes a slitting blade 2 and a cooling blade 3.

The slitting blade 2 has a sharpened front end 4 and a rearwardly extending body part 5 which is defined by parallel sides 6 and 7.

The slitting blade is comprised of steel and is connected between two electrodes 8 and 9 by which a substantial electric current is caused to flow through the generally uniform cross sectional area defined by the blade shape as shown and in this manner is caused to be heated to an appropriate heat.

Such a temperature can be varied in accord with the type and grade of plastic that is being slit but typically for a polythene plastics material having a melt temperature of approximately 120 degrees centigrade would mean that a temperature on a surface of the blade of 150 degrees centigrade is appropriate.

Located immediately behind the slitting blade 2 and separated only by a small gap 10, there is provided a cooling blade 3 which is made from copper and which is kept cool by a plurality of water carrying conduits 11 carrying water that is kept to relatively cold temperature so that the blade is kept to a temperature of approximately 10 degrees centigrade.

The cooling blade 3 has sides 12 and 13 which are aligned with the sides 6 and 7 of the slitting blade 2 so that any material after slitting will tend to maintain some peripheral contact so that by a combination of radiant loss and conducting loss, the melted plastics will be rapidly cooled and, therefore, caused to maintain adherence to the passing foil material.

It has been found to be of advantage that the foil material 14 which, in this embodiment is comprised of three welded together sheets of polythene plastics material, is supported during the slitting operation on the outer peripheral surface of a drum 15 which includes a slot corresponding in position to the lower end of the blade 2.

Such an arrangement assists in keeping the thermoplastics foil in a fixed position relative to the slitting action of the blade 2.

This then describes the preferred arrangement.

By using heating to effect at least substantial melting and then quickly resolidifying the melted material, has two very significant advantageous results.

The first of these is to remove or at least significantly reduce the extent to which an offsetting bias can be otherwise caused by using a cutting blade through extruded polythene sheet type materials or other extruded thermoplastics materials.

Secondly, while the life of the blade 2 and particularly the effectiveness of a sharp cutting edge is very extensively extended, the previous disadvantage of debris build up has been avoided by simply hardening the debris very quickly and then causing this to be kept with the moving plastic foil and therefore, being effectively disposed of on a continuing basis.

The results, in any event, have disclosed that this has shown itself to be a very effective technique for the purposes described.

I claim:

1. Apparatus for slitting a continuously moving sheet of thermoplastics material comprising a slitting blade at a first location, means to raise and maintain a temperature of the slitting blade to a temperature equal to or above a melting temperature of the thermoplastics material selected to be slit by the slitting blade, and cooling means at a second location downstream of said slitting blade adapted to effect a rapid cooling of any melted thermoplastics material, said cooling means including a cooling blade located behind the slitting blade and means to effect a cooling of said cooling blade.

2. Apparatus as in claim 1 in which said slitting blade is stationary.

3. A method of effecting a slitting of a moving foil of a thermoplastics material comprising passing the thermoplastics foil through a slitting station in which there is a slitting blade having a sharp front edge and which is maintained at a temperature sufficiently high to cause melting of the thermoplastics material, and then passing the foil past a cooling blade which is maintained at a temperature substantially below the melting temperature of the thermoplastics material, thereby effecting retention of the thus melted plastics with the passing thermoplastics material by effecting a rapid cooling of such melted material after such slitting.

4. A method as in the claim 3 further characterised in that the thermoplastics material is polythene, the slitting blade is held to a temperature of approximately 150 degrees centigrade and the cooling is effected by a cooling blade which is kept to a temperature of approximately 10 degrees centigrade.

5. Apparatus for slitting a moving foil of thermoplastics material as said foil moves along a predetermined path, said apparatus comprising;
    (a) a slitting station having a slitting blade having a sharp front edge located to extend transversely through the path of the moving foil, a body portion including a pair of parallel sides extending rearwardly from said front edge, and heating means for heating said blade to a temperature above the melt temperature of the thermoplastics material to be slit;
    (b) a cooling blade which is separated from said slitting blade and located downstream therefrom in the direction of travel of said moving foil, said cooling blade having two sides which are respectively aligned with the sides of said slitting blade, and cooling means for cooling said cooling blade; and
    (c) means for moving said foil successively through said slitting station and past said cooling blade in the order named.

6. Apparatus for slitting foil of thermoplastics material as in claim 5 in which the slitting blade is comprised of an electrically conducting metal, and the heating means comprise electrical heating means.

7. Apparatus as in claim 5 in which the cooling blade is comprised of a material being a thermal conductor, and the cooling means include a supply of cooling fluid passing through conduit within the thermal conducting material of the said cooling blade.

8. Apparatus as in the claim 7 in which the cooling fluid is water.

9. Apparatus as in claim 7 in which the slitting blade has sides downstream of the sharpened front edge which are parallel one to the other, and the cooling blade has sides which are aligned with a respective side of each of the sides of the said slitting blade.

10. Apparatus as in claim 5 in which there is a slitting station and in which there it a drum having a peripheral surface on which the foil is supported as it passes through the slitting station, and the slitting blade has an outermost end engaging into a slot within the peripheral surface of the drum.

11. Apparatus as in claim 10 in which said drum and said slitting station are on opposite sides of the path of said thermoplastics material.

* * * * *